R. S. GITT.
POULTRY FEEDING DEVICE.
APPLICATION FILED APR. 10, 1914.
1,125,839.
Patented Jan. 19, 1915.
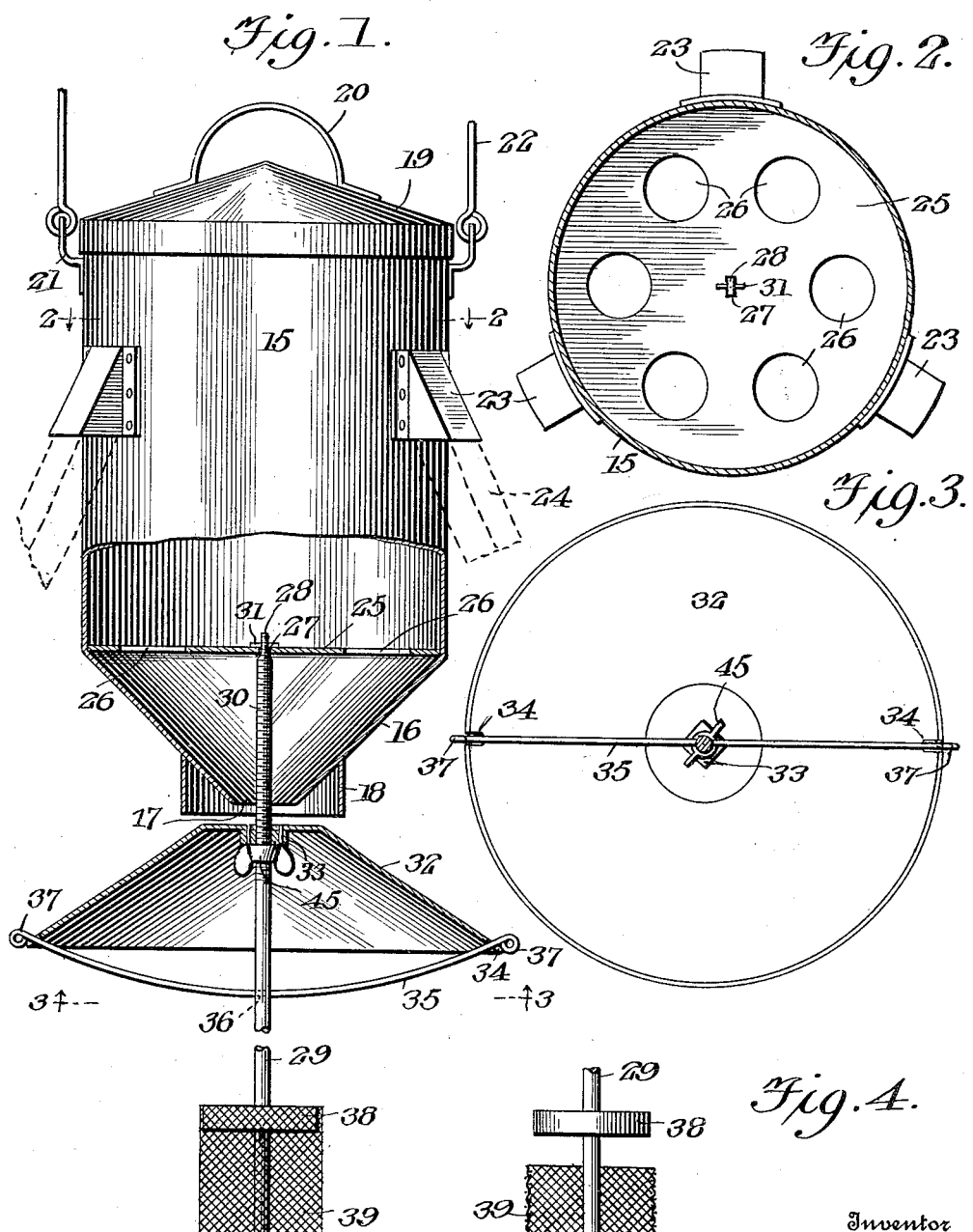
Witnesses
Hugh H. Ott
Wm. Dagger
Inventor
Robert S. Gitt
By Victor J. Evans
Attorney
THE NORRIS PETERS CO., PHOTO-LITHO., WASHINGTON, D. C.

UNITED STATES PATENT OFFICE.

ROBERT S. GITT, OF LITTLESTOWN, PENNSYLVANIA.

POULTRY-FEEDING DEVICE.

1,125,839.  Specification of Letters Patent. Patented Jan. 19, 1915.

Application filed April 10, 1914. Serial No. 831,094.

*To all whom it may concern:*

Be it known that I, ROBERT S. GITT, a citizen of the United States, residing at Littlestown, in the county of Adams and State of Pennsylvania, have invented new and useful Improvements in Poultry-Feeding Devices, of which the following is a specification.

This invention relates to poultry feeding devices of that class in which a hopper is supported at a suitable elevation, said hopper being provided with an outlet and with a member supported for vibration within said outlet and extending therethrough, said member constituting an agitator by the action of which the contents of the hopper is assisted to escape through the outlet and on to a deflector carried by said vibratory member.

The object of the invention is to simplify and improve the manner of mounting the deflector of the vibratory member in such a manner that it will be adjustable with respect to the outlet of the hopper and incapable of being accidentally displaced.

With this and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that charges, alterations and modifications within the scope of the claim may be resorted to when desired.

In the drawing,—Figure 1 is a side elevation of a poultry feeding device construced in accordance with the invention. Fig. 2 is a sectional view taken on the line 2—2 in Fig. 1. Fig. 3 is a sectional view taken on the line 3—3 in Fig. 1. Fig. 4 is a sectional detail view to illustrate the construction of the bait cage.

Corresponding parts in the several figures are denoted by like characters of reference.

The hopper or receptacle 15 is mainly of cylindrical shape, but is equipped with a frusto-conical or funnel-shaped bottom portion 16 having an outlet 17. Secured on said bottom portion is an annular cylindrical flange 18 extending downwardly a short distance below the mouth or aperture 17 which is surrounded thereby. The hopper cylinder has been shown as being provided with a removable cover 19 having a handle 20. Said receptacle is also provided with ears 21 for the attachment of a bail, a portion of which is shown at 22, whereby said receptacle may be carried and which may also serve to suspend it at a desired elevation. For convenience the cylindrical body has also been shown as being equipped with socket members 23 to receive the upper end of the legs or supporting members, partly shown in dotted lines at 24, whereby the device may be supported when preferred.

The hopper is provided with an interior diaphragm 25 which is supported at the junction of the cylindrical portion and the funnel-shaped bottom portion, said diaphragm having apertures 26 arranged in circumferenital series. The diaphragm is also provided with a central aperture 27 for the passage of the reduced upper extremity 28 of a vibratory rod 29 which latter extends downwardly through the mouth 17 of the hopper. The upper end of the rod 29 is screw threaded, as at 30, and said rod is held in position by means of a key 31 extending transversely through the reduced portion of the rod above the diaphragm.

32 is a frusto-conical deflector which is supported on the rod 29 below the mouth of the hopper by means of a nut 33 having threaded engagement with the threaded portion of the rod, it being understood that the nut is fixedly connected with the deflector so that, as a matter of fact, said deflector is in threaded engagement with the rod. The deflector is provided at its lower edge with diametrically opposite notches 34 for the reception of the two ends of an arcuate spring 35 which is fixedly connected with the rod below the deflector, preferably by extending said spring through an aperture 36 of said rod. The ends of the springs are bent to form eyes 37 that serve to form handles whereby the said ends of the spring may be readily engaged or disengaged from the respective notches, said eyes serving also to constitute stops to prevent accidental disengagement. A lock nut 45 may also be used if desired.

The rod 29 is provided near its lower end with a collar 38 serving to form a lid for a cylindrical cage or gasket 39 which is fitted on the lower end of the rod, the bottom member 40 of said cage being apertured for the passage of the lower extremity of the rod which is provided with a transversely extending key 41 for the purpose of maintaining the parts in assembled relation. This cage may be filled with grain or other feed to attract the fowls that are to be fed.

In the operation of this device, the hopper is supplied with feed, such as grain, cracked corn, meal or the like, the contents being protected by the lid 19. The deflector 32 is adjusted to a suitable distance beneath the mouth or outlet of the hopper, this being readily effected by first bending the spring to disengage the ends thereof from the notches 34, after which the deflector may be rotated until the desired adjustment has been reached, after which the ends of the spring will be again placed in engagement with the notches. Accidental displacement of the deflector will thus be positively prevented. The fowls, by pecking at the bait cage will vibrate the rod 29, thus causing the upper end of said rod to agitate that portion of the feed which has leaked through the apertures 26 of the diaphragm 25, the purpose of the latter being to support the superposed feed material and to prevent its escaping too rapidly, thereby choking the lower end of the hopper and preventing vibratory movement of the rod 29, thus defeating the purposes of the invention. As the feed material escapes through the mouth 17 it drops on the upper flat surface of the deflector and is thence shaken over the sloping inclined sides of the deflector and scattered over a wide area. The depending flange 18 which surrounds the flat top portion of the deflector will effectually prevent sparrows and other predatory birds from alighting on the deflector and stealing the food. The bait cage is simple in construction and permits the contents to be renewed at any time with little trouble.

Having thus described the invention, what is claimed as new, is:—

In a device of the class described, a feed hopper having a constricted outlet, a vibratory member suspended within the hopper and extending through the outlet, said vibratory member having a screw threaded portion, a frusto-conical deflector having threaded engagement with said screw threaded portion and provided at its lower end with diametrically opposite notches, and a curved spring connected with the vibratory member and terminally engaging said notches.

In testimony whereof I affix my signature in presence of two witnesses.

ROBERT S. GITT.

Witnesses:
 CHARLES H. MAYERS,
 WILLIAM F. WEAVER.

Copies of this patent may be obtained for five cents each, by addressing the "Commissioner of Patents, Washington, D. C."